United States Patent
Dyson, Jr.

(10) Patent No.: US 11,371,431 B1
(45) Date of Patent: Jun. 28, 2022

(54) THERMAL MANAGEMENT SYSTEM

(71) Applicant: United States of America as represented by the Administrator of NASA, Washington, DC (US)

(72) Inventor: Rodger W. Dyson, Jr., Elyria, OH (US)

( * ) Notice: Subject to any disclaimer, the term of this patent is extended or adjusted under 35 U.S.C. 154(b) by 111 days.

(21) Appl. No.: 16/714,131

(22) Filed: Dec. 13, 2019

Related U.S. Application Data

(63) Continuation-in-part of application No. 15/344,661, filed on Nov. 7, 2016, now Pat. No. 10,507,934.
(60) Provisional application No. 62/873,349, filed on Jul. 12, 2019, provisional application No. 62/251,989, filed on Nov. 6, 2015.

(51) Int. Cl.
| | |
|---|---|
| *F02C 6/18* | (2006.01) |
| *B64D 27/12* | (2006.01) |
| *B64D 27/24* | (2006.01) |
| *F02C 6/20* | (2006.01) |

(Continued)

(52) U.S. Cl.
CPC ............... *F02C 6/18* (2013.01); *B64D 27/12* (2013.01); *B64D 27/24* (2013.01); *F02C 6/20* (2013.01); *F02G 5/02* (2013.01); *B64D 2027/026* (2013.01); *F02G 2243/54* (2013.01); *F02G 2254/15* (2013.01); *F05D 2220/323* (2013.01); *F05D 2220/76* (2013.01); *F05D 2260/208* (2013.01); *F05D 2260/213* (2013.01)

(58) Field of Classification Search
CPC .. F25B 27/02; F25B 9/145; F25B 2309/1403; F25B 2309/1407; B64D 33/08; B64D 37/34; F02C 6/18; F02G 2243/54
See application file for complete search history.

(56) References Cited

U.S. PATENT DOCUMENTS

| | | | | |
|---|---|---|---|---|
| 4,584,840 A | * | 4/1986 | Baumann | F25B 9/14 |
| | | | | 62/6 |
| 4,722,201 A | * | 2/1988 | Hofler | F25B 9/145 |
| | | | | 60/516 |

(Continued)

FOREIGN PATENT DOCUMENTS

| | | | |
|---|---|---|---|
| NL | WO9011447 A1 | 10/1999 | |
| NL | WO2005/001269 A1 | 1/2005 | |
| NL | WO2010107308 A1 | 9/2010 | |

OTHER PUBLICATIONS

Rodger W. Dyson, Novel Thermal Energy Conversion Technologies for Advanced Electric Air Vehicles, 2018 AIAA/IEEE Electric Aircraft Technologies Symposium, Jul. 2018, pp. 1-14, Cincinnati, Ohio, US.

(Continued)

*Primary Examiner* — Tye William Abell
(74) *Attorney, Agent, or Firm* — Robert H Earp, III; Mark Wolfgang; Helen M. Gaius

(57) ABSTRACT

A thermal management system for an aircraft is provided that includes thermo-acoustic engines that remove and capture waste heat from the aircraft engines, heat pumps powered by the acoustic waves generated from the waste heat that remove and capture electrical component waste heat from electrical components in the aircraft, and hollow tubes disposed in the aircraft configured to propagate mechanical energy to locations throughout the aircraft and to transfer the electrical component waste heat back to the aircraft engines to reduce overall aircraft mass and improve propulsive efficiency.

17 Claims, 14 Drawing Sheets

(51) Int. Cl.
*F02G 5/02* (2006.01)
*B64D 27/02* (2006.01)

(56) References Cited

U.S. PATENT DOCUMENTS

| | | | |
|---|---|---|---|
| 4,858,441 A | | 8/1989 | Wheatley et al. |
| 5,901,556 A | * | 5/1999 | Hofler ................ F25B 9/145 |
| | | | 62/6 |
| 6,314,740 B1 | | 11/2001 | De Blok et al. |
| 6,374,617 B1 | | 4/2002 | Bonaquist et al. |
| 7,131,288 B2 | * | 11/2006 | Toonen ............... F28F 13/003 |
| | | | 62/324.1 |
| 2004/0093865 A1 | * | 5/2004 | Weiland .............. F02G 1/0435 |
| | | | 60/520 |
| 2006/0119224 A1 | * | 6/2006 | Keolian .............. H01L 41/113 |
| | | | 310/339 |
| 2008/0223579 A1 | | 9/2008 | Goodwin |
| 2011/0025073 A1 | * | 2/2011 | Garner ................ F02G 1/043 |
| | | | 290/40 E |
| 2011/0162827 A1 | | 7/2011 | Riley |
| 2013/0092350 A1 | * | 4/2013 | N. ....................... F01D 9/06 |
| | | | 165/51 |
| 2015/0207157 A1 | * | 7/2015 | Ono .................... H01M 8/0662 |
| | | | 429/408 |
| 2016/0007773 A1 | * | 1/2016 | Renshaw ............ A47G 9/0215 |
| | | | 62/6 |
| 2016/0177802 A1 | * | 6/2016 | Courtes ............... F01P 1/06 |
| | | | 60/320 |

OTHER PUBLICATIONS

Rodger W. Dyson, Novel Thermal Energy Conversion Technologies for Advanced Electric Air Vehicles, presentation, Jul. 12, 2018, https://ntrs.nasa.gov/archive/nasa/casi.ntrs.nasa.gov/20180006124.pdf.

http://www.aster-thermoacoustics.com/.

* cited by examiner

THERMAL MANAGEMENT SYSTEM

CROSS-REFERENCE TO RELATED APPLICATIONS

This application claims benefit of U.S. Provisional Patent Application Ser. No. 62/873,349 filed on Jul. 12, 2019 entitled "Electric Aircraft Cyrogenic Cooling with Thermo-acoustic Energy Management." This application is also a Continuation-In-Part of U.S. patent application Ser. No. 15/344,661 filed on Nov. 7, 2016 entitled "Thermal Management System," which claims the benefit of U.S. Provisional Patent Application Ser. No. 62/251,989 entitled "Flight-Weight Electric Aircraft Propulsion Thermo-Acoustic-Based Thermal Management System" filed on Nov. 6, 2015. The entirety of the above-noted applications are incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

Full-scale electric aircraft requires approximately 50 MW of electric power to be delivered to electric motor propulsors that are strategically distributed throughout the aircraft for optimal system performance. The complete power system including a turbo-generator, distribution, protection, converters, and motors all generate heat that must be dissipated. Studies suggest that over half the mass associated with a full electric power propulsion system is attributed to the thermal management system and as such is likely a key limiting factor to achieving economical flight. Moreover, as the operating temperature is reduced, the power and motor components become flight-weight and more efficient but often at the expense of increased thermal management system mass. In particular, the best system performance is predicted to occur at cryogenic temperatures. Ideally the aircraft thermal management system can lift 500 kW or more of heat from 50K to 300K with a mass of 3 kg/kw or 1500 kg overall.

Today's aircraft generators are cooled convectively with jet fuel that is readily available at ambient temperatures. This is safe because the aircraft bus voltage is below the Paschen curve at 270V. Even if the insulation fails, a spark is not likely to form and ignite nearby jet fuel. Future aircraft, however, require a bus voltage of over 4500V to keep the overall system mass and efficiency optimized for flight. At these high voltages a spark could ignite standard jet fuel as well as the alternative cryogenic fuels such as liquid methane/hydrogen.

A second approach is to provide an inert cooling fluid such as liquid nitrogen and utilize a heat pump such as reverse Brayton to refrigerate the fluid. This, however, is difficult to achieve flight-weight systems with that approach due to system complexity, which includes coolant pumps, vacuum jacketed plumbing, size-able heat exchangers and recuperation mass. Further, such a system will deplete power from the turbo-generators to operate the turbo-alternators. For cryogenic systems it is not likely possible to directly shaft connect the warm turbo-generator to the cryogenic turbo-alternator or other combinations in which an ambient component would be connected to a cryogenic component. Other approaches such as convective air cooling are inadequate for the amount of heat lift required in full-scale electric aircraft.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation disclosed herein comprises a thermal management system for an aircraft that includes a plurality of thermo-acoustic engines configured to absorb waste heat from a plurality of aircraft engines, a plurality of heat pumps configured to absorb electrical component waste heat from electrical components of the aircraft, a plurality of first hollow tubes disposed in the aircraft configured to propagate mechanical energy to locations throughout the aircraft, and a plurality of second hollow tubes configured to transfer the electrical component waste heat to the aircraft engines.

In another aspect, the innovation disclosed herein comprises a method of utilizing waste heat from an aircraft engine that includes providing a thermal management system having a plurality of thermo-acoustic engines, a plurality of heat pumps, and a plurality of acoustic hollow tubes and a plurality of heat pipe hollow tubes that transfer mechanical energy and waste heat respectively, capturing engine waste heat from the aircraft engine by a thermo-acoustic engine, converting the engine waste heat into mechanical energy, propagating the mechanical energy along the plurality of acoustic hollow tubes, converting the mechanical energy into usable electric energy, powering aircraft electrical components including the plurality of heat pumps with the usable electric and/or mechanical energy, absorbing electrical component waste heat by a cold heat exchanger of the heat pumps, raising a reject temperature of the electrical component waste heat, and preheating fuel and/or air supplied to the aircraft engine.

In still another aspect, the innovation disclosed herein includes a system to increase efficiency of a turbofan jet engine on an aircraft that includes a plurality of thermo-acoustic engines configured to absorb waste heat from a plurality of aircraft engines, a plurality of heat pumps configured to absorb electrical component waste heat from electrical components of the aircraft, a plurality of acoustic wave hollow tubes disposed in the aircraft configured to propagate mechanical energy to locations throughout the aircraft, and a plurality of heat pipe hollow tubes configured to transfer the electrical component waste heat to the plurality of aircraft engines.

In still another aspect, the innovation disclosed herein pertains to an apparatus. The apparatus includes a thermo-acoustic engine including a first heat exchanger, a regenerator, and a second heat exchanger disposed in a pulse tube. The first heat exchanger is maintained at a higher temperature than the second heat exchanger by exposure to heat from a first heat source. The thermo-acoustic engine is configured to generate an acoustic wave within the pulse tube. The apparatus also includes an acoustic tube configured to receive the acoustic wave. The apparatus also includes a thermo-acoustic heat pump configured to receive the acoustic wave via the acoustic tube, wherein the thermo-acoustic heat pump comprises a first heat exchanger, a regenerator, and a second heat exchanger disposed in a pulse tube. The first heat exchanger of the heat pump is maintained at a higher temperature than the second heat exchanger due to the acoustic wave performing work to transfer heat from a second heat source coupled to the second heat exchanger to the first heat exchanger.

In still another aspect, the innovation disclosed herein pertains to a method of utilizing waste heat from an aircraft engine comprising. The method includes generating an acoustic wave via a thermo-acoustic engine using exhaust of the aircraft engine to create a thermal gradient in the thermo-acoustic engine. The method also includes providing, via an acoustic waveguide, the acoustic wave to a thermo-acoustic heat pump. The method also includes pumping, via the thermo-acoustic heat pump, heat from a heat source disposed proximate to the thermo-acoustic heat pump. The thermo-acoustic heat pump includes a first heat exchanger, a regenerator, and a second heat exchanger. The first heat exchanger is heated via the heat source. The second heat exchanger is maintained at a higher temperature than the first heat exchanger due to work performed via the acoustic wave.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
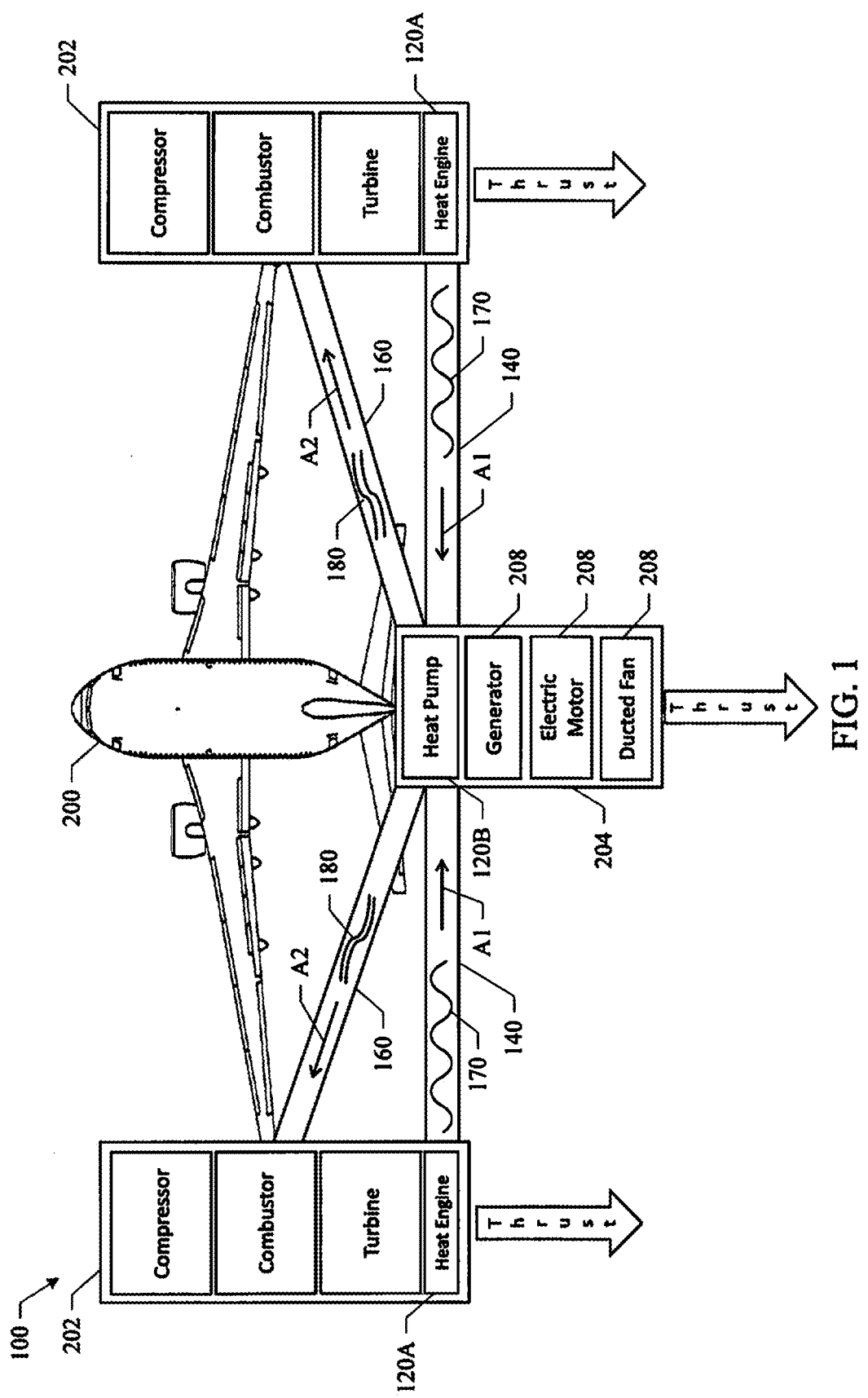
FIG. 1 is a schematic illustration of an innovative thermal management system for an aircraft in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative light-weight and fuel efficient thermal energy management system for electric aircraft propulsion systems for both ambient and cryogenic systems in accordance with an aspect of the innovation. As mentioned above, a key problem with current ambient and cryogenic aircraft propulsion systems is the mass burden of cooling the high power electric motors and electronics. The anticipated significant mass addition required for thermal management can nullify the entire benefit of utilizing electric propulsion in aircraft due to the additional induced drag on the aircraft. Moreover, the traditional method of cooling aircraft generators with standard jet fuel is not cold enough for use in future flight-weight cryogenic systems. Still further, the much higher voltages required for flight weight systems (4.5 kV vs. 270V) introduces additional spark ignition hazards associated with alternative cryogenic cooling fuels including liquid methane or liquid hydrogen.

In order to overcome these disadvantages, the innovative thermo-acoustic-based thermal energy management system uses waste energy from turbo-generators to thermos-acoustically create a pressure wave that is delivered, via a routed duct work, to pulse-tube coolers located at all components requiring cooling in the aircraft. In other words, the thermal management system uses aircraft engine waste heat to produce a high intensity acoustic wave with no hot moving parts that can be used for power generation or component cooling. A temperature gradient between hot and cold heat exchangers in a heat engine efficiently creates the acoustic waves. The innovative thermal management system can be used for both cryogenic and ambient electric aircraft and can be cooled with minimal mass, fuel, and risk with the innovative thermal management system.

As mentioned above, the thermal management system uses normally wasted energy from turbofan propulsion, which is considerable in large aircraft. For example, the Boeing 737 passenger transport aircraft utilizes open cycle Brayton turbofan propulsion engines, which generate about 50 MW of thrust, but waste about 45 MW of the available fuel energy through the exhaust. The typical exhaust temperatures are about 850° C. which are ideal for a bottoming cycle. The innovative thermal management system recovers this waste heat energy and uses it to drive a thermo-acoustic based ambient or cryogenic heat pump.

Several embodiments are possible including channeling some of the hot exhaust gases directly into a thermo-acoustic engine to internally heat it, or to convectively heat the external portion of the engine using turbine exit fins in the exhaust, or to utilize the electric energy from a turbo-generator to drive a pulse-tube generator. In each of the above cases, an acoustic wave is developed that can quietly and efficiently transfer energy via a traveling wave to each component requiring cooling through a hollow channel/tube. An acoustic heat pump can then be located directly at each motor and converter to provide cooling using the energy delivered in the tube. Each heat pump can be two stages, which is beneficial for keeping the environmental heat out while also rejecting the heat generated from within the power system. Further, because the heat pump itself can reject heat at higher than ambient temperature this reduces the size and mass of radiating fins.

Referring now to the drawings, FIG. 1 is an overall system representation of an innovative thermal management system 100 for use on an aircraft 200 in accordance with an aspect of the innovation. The thermal management system 100 takes advantage of engine waste heat to create power generation, operate electrical components on the aircraft, and increase the efficiency of the aircraft engines.

The thermal management system 100 includes heat engines 120A, one or more first hollow tubes (acoustic tubes) 140, and one or more second hollow tubes (heat pipes) 160. The thermal management system 100 extracts or captures waste energy from turbofan aircraft engines 202 using thermos-acoustic technology that converts heat into an acoustic (sound) wave 170. Since sound waves can transfer energy over a distance, the sound wave delivers energy throughout the aircraft 200, which in some embodiments is converted into usable electric energy using a transducer such as a linear alternator or piezoelectrics and can be used to operate electric aircraft components including electric propulsion engines 204. The delivered acoustic energy can also be used to operate a heat pump, which removes heat from electrical components and raises the reject temperature to approximately 400-600° C. so that the heat can be returned back to the turbofan engine via a heat pipe. This returned heat can be used to preheat the fuel or air for the turbofan engine.

Figure 2:
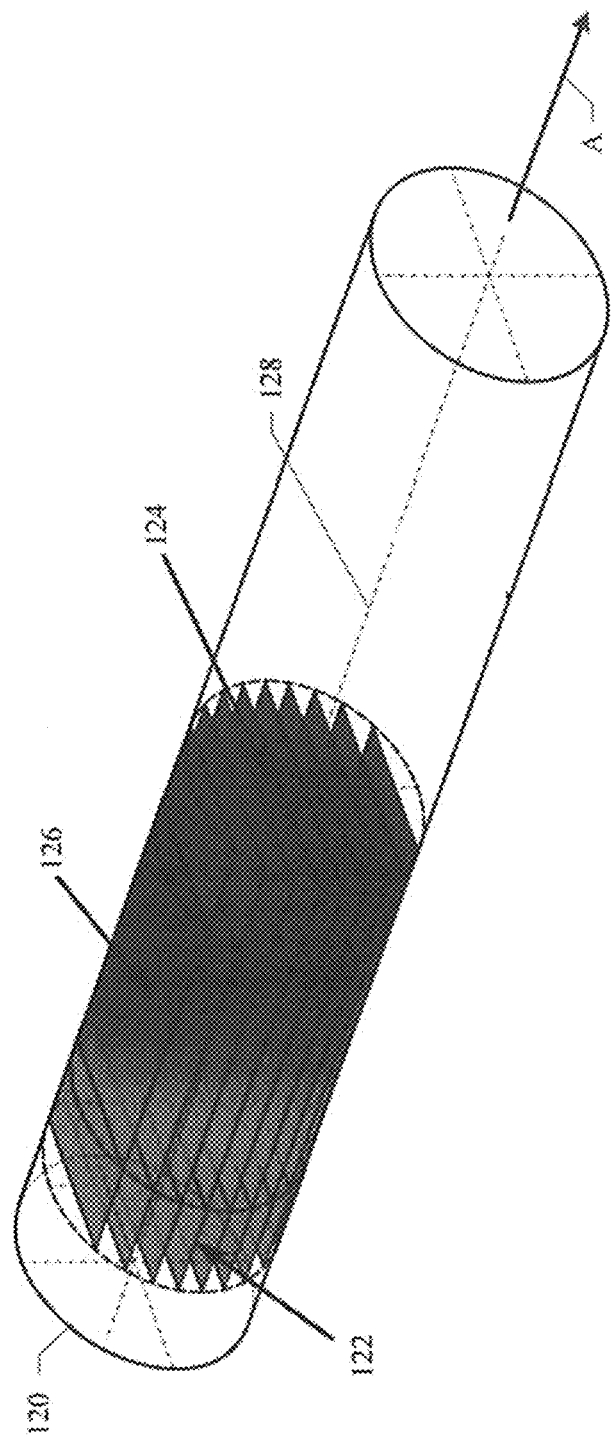
FIG. 2 is a perspective view of a heat exchanger including hot region, regenerator, and cold region in accordance with aspects of the innovation.
Figure 3:
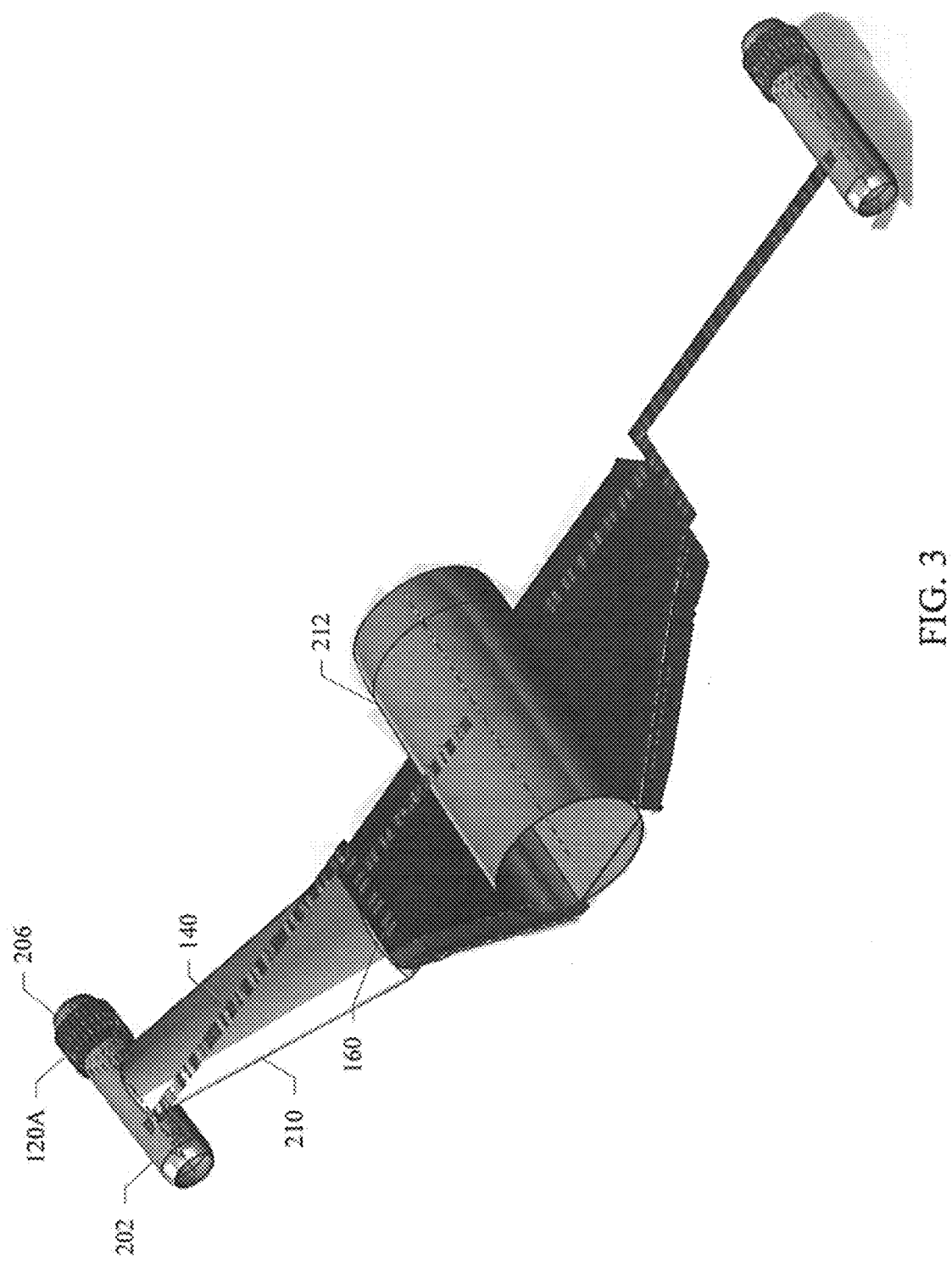
FIG. 3 is a perspective view of a wing and engine section of an aircraft illustrating a location of hollow acoustic wave tubes of the thermal management system in accordance with aspects of the innovation.

Referring to FIGS. 1 and 2, based on the location of the heat exchangers 120 in the aircraft, the heat exchangers 120 may function as either a thermo-acoustic heat engine 120A or a heat pump 120B and include a hot heat exchanger 122, a cold heat exchanger 124, a regenerator 126, and a resonator 128.

Referring to FIGS. 1-5, in one example embodiment, the thermo-acoustic heat engines 120A are located near a rear 206 (near the exhaust) of the turbofan engines 202. The hot exchanger 122 is heated either externally or internally with hot gases from the turbofan aircraft engines 202. Jet fuel or air flows over the cold heat exchanger 124 for cooling purposes.

The thermo-acoustic heat engines 120A remove engine waste heat from the turbine exhaust using fins located parallel to exhaust flow from the aircraft engines 202 for flow straightening and a high heat transfer rate. The waste heat is absorbed by the hot heat exchanger 122 and travels through the regenerator 126 to the cold heat exchanger 124. As mentioned above, the temperature gradient between the hot and cold heat exchangers 122, 124 efficiently creates mechanical energy in the form of the sound wave 170. The sound wave 170 propagates from the cold heat exchanger side as indicated by the arrow A in FIG. 2. The advantage to this form of energy is that no additional weight was added to the aircraft.

The sound wave 170 travels through the first hollow tubes 140 from the turbofan engine 202 to other areas in the aircraft 200 in a direction indicated by the arrow A1 (see FIG. 1). The representation of the thermal management system 100 and the aircraft 200 in FIG. 1 is a single line-type schematic diagram that shows only a single electric propulsion engine 204 and a single heat pump. It is to be understood, however, that the thermal management system 100 is configured to manage multiple electric propulsion engines 204 (see FIG. 5), multiple heat pumps, multiple electric components, etc.

The sound wave 170 is converted to electrical energy by transducers and is used to operate electric components 208, such as but not limited to, the electric components of the electric propulsion engine 204 (e.g., a generator, an electric motor, fans, etc.) or any other electric components associated with the aircraft. The electrical energy can also be used to operate the heat pump(s) 120B throughout the aircraft.

The heat pump(s) 120B serve a couple of functions. First, the heat pump(s) 120B captures or absorbs electrical component waste heat from the aircrafts electrical components through the cold heat exchanger 124 and transfers the waste heat to the hot heat exchanger 122 and dissipates the electrical component waste heat into the atmosphere using smaller heat exchangers. The hot heat exchanger 122 raises the reject temperature of the waste heat from the electric components. In one embodiment, for example, the heat pump(s) 120B may raise the reject temperature from approximately 100-200° C. to approximately 400-600° C. Higher reject temperatures translate into lighter radiator/convective heat exchanger weights to dissipate heat into atmosphere and higher quality heat can be pumped back into turbofan engines 202, as will be subsequently described.

A second function of the heat pump(s) 120B is to transfer waste heat back to the turbofan engines 202 to preheat the fuel and/or air. Thus, once the temperature of the waste heat is raised, as previously mentioned, a usable electrical component waste heat 180 is transferred from the heat pump(s) 120B back to the turbofan engines 202 via the second hollow tubes 160 in a direction indicated by the arrow A2. The usable waste heat 180 can be used to preheat the fuel and/or air to the turbofan engines 202, which increases the efficiency of the engines 202.

Still referring to FIGS. 1-5, in one embodiment, one or both of the first and second hollow tubes 140, 160 can be added to the aircraft 200 and channeled through parts of the aircraft, such as the wing 210, fuselage 212, etc. Because the hollow tubes 140, 160 are hollow and thin walled they add nearly no additional weight to the aircraft. In another embodiment, the hollow tubes 140, 160 can be incorporated or integrated into the aircraft itself and serve to transfer the sound wave and waste heat. The integrated tubes can be pressurized with a gas, such as but not limited helium, and also be used as a support structure for the aircraft and, thus, would be near zero weight added to the aircraft.

Figure 6:
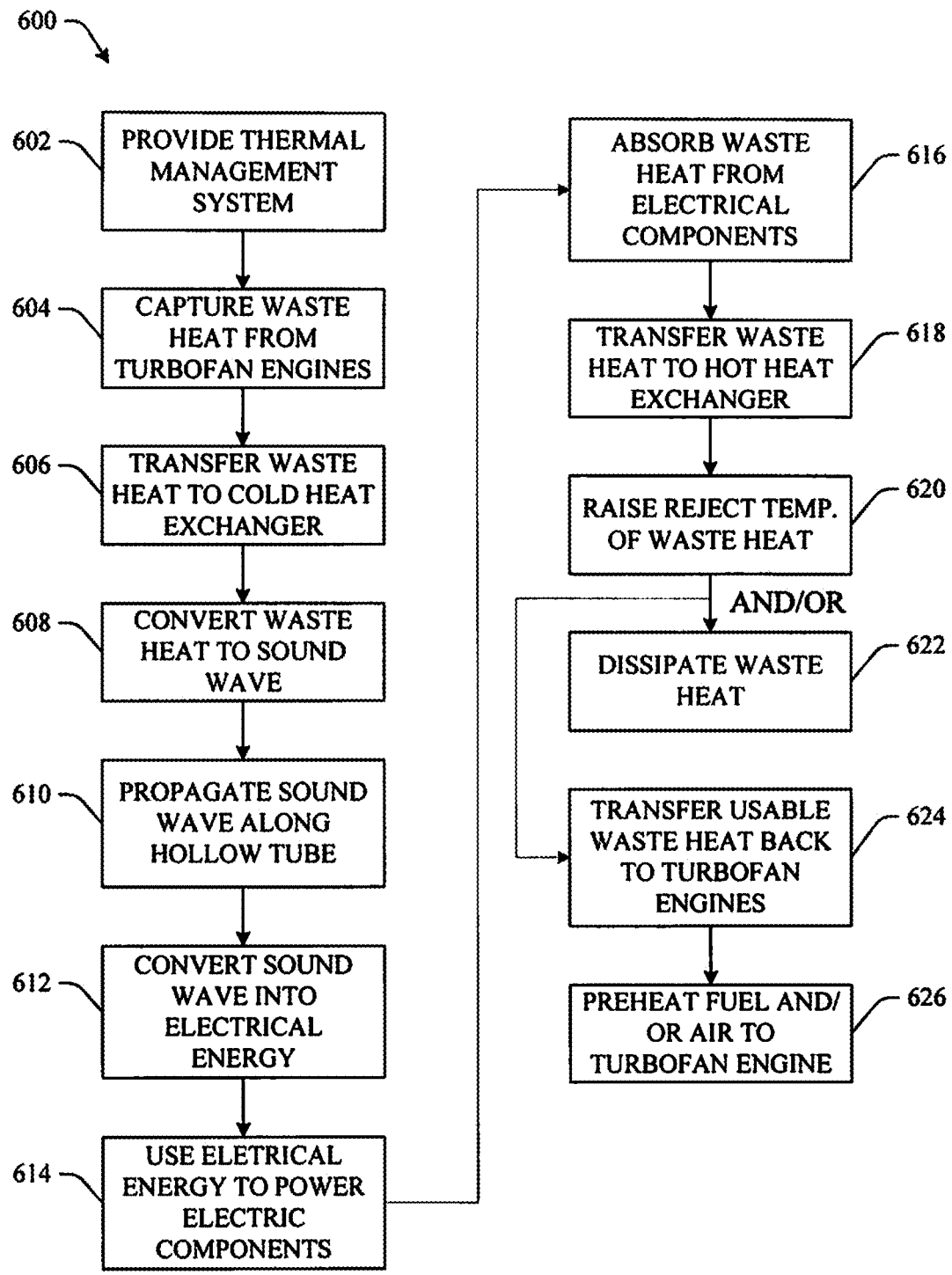
FIG. 6 is a block diagram illustration of a method to utilize waste heat from a turbofan engine to generate power, cool electrical components, and increase fuel efficiency of the aircraft in accordance with aspects of the innovation.

Referring to FIG. 6, a method 600 to utilize waste heat from a turbofan engine to generate power, cool electrical components, and increase fuel efficiency of the aircraft will now be described. At 602, a thermal management system 100 is provided that includes thermo-acoustic heat engines 120A, heat pumps 120B, and hollow tubes 140, 160 that transfer mechanical energy and waste heat respectively. At 604, engine waste heat is captured by the hot heat exchanger 122 of the thermo-acoustic engines 120A. At 606, the waste heat is transferred to the cold heat exchanger 124. At 608, the waste heat is converted into mechanical energy and more specifically, into a sound wave 170 during transfer to the cold heat exchanger 124. At 610, the sound wave 170 propagates along a first hollow tube 140 to other areas of the aircraft having electrical components. At 612 the sound wave is converted into usable electrical energy as described herein. At 614, the electrical energy is delivered to and used to power electrical components including, but not limited to, electric propulsion engines. Thus, as described herein, the engine waste heat from the turbofan engines 202 is used to operate electrical components and also generate power or thrust. At 616, electrical component waste heat from the electrical components is absorbed by the cold heat exchanger 124 of the heat pump 120B. At 618, the electrical component waste heat is transferred to the hot heat exchanger 122 in the heat pump 120B. At 620, the hot heat exchanger 122 raises the reject temperature of the electrical component waste heat. At 622, the waste heat is dissipated into the atmosphere. Or at 624, the electrical component waste heat is used (usable waste heat 180) and is transferred back to the turbofan engines 202 and at 626, the usable waste heat 180 is used to preheat the fuel and/or air supplied to the turbofan engine 202. It is to be understood, that 622 and 624 can also occur simultaneously.

Figure 7:
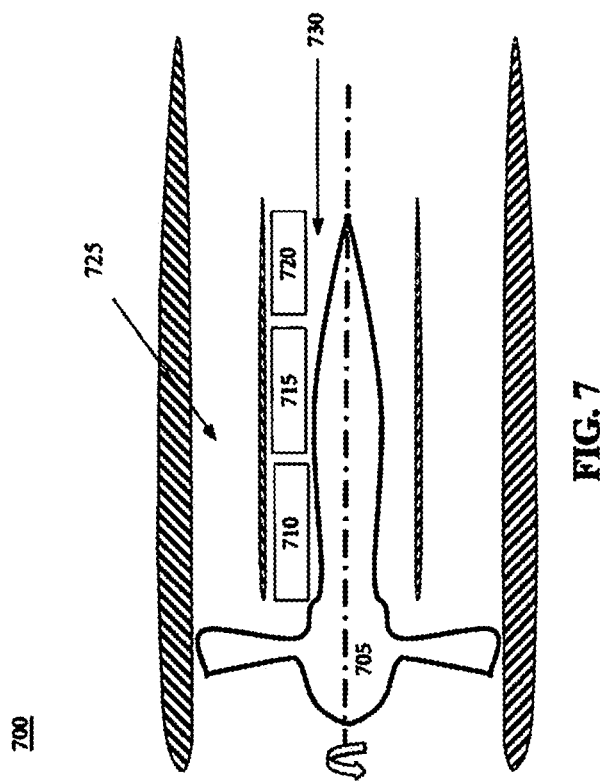
FIG. 7 is a schematic diagram of a turbine engine that may be used in conjunction with a thermal management system in accordance with aspects of the innovation.

Referring now to FIG. 7, a schematic of an exemplary gas turbine engine 700 is shown, in accordance with an aspect of the present innovation. Engine 700 is shown for purposes of exemplifying potential placement for components of the thermal management systems described herein. In the simplified example shown, gas turbine engine 700 includes a fan 705, a core section 730, and a bypass section 725. The core section 730 includes a compressor 710, combustor 715, and turbine 720; and is surrounded by the bypass section 725. Core section 720 may produce hot exhaust downstream of turbine 720. In various embodiments, bypass section 725 allows a majority of the air entering the gas turbine engine 700 to bypass core section 730. In certain embodiments, most of the thrust (e.g., over 80%) produced via the gas turbine engine 700 may be produced in the air traversing the bypass section 725 (e.g., the airflow compressed by fan 705, but not entering components of the core section 730).

Figure 4:
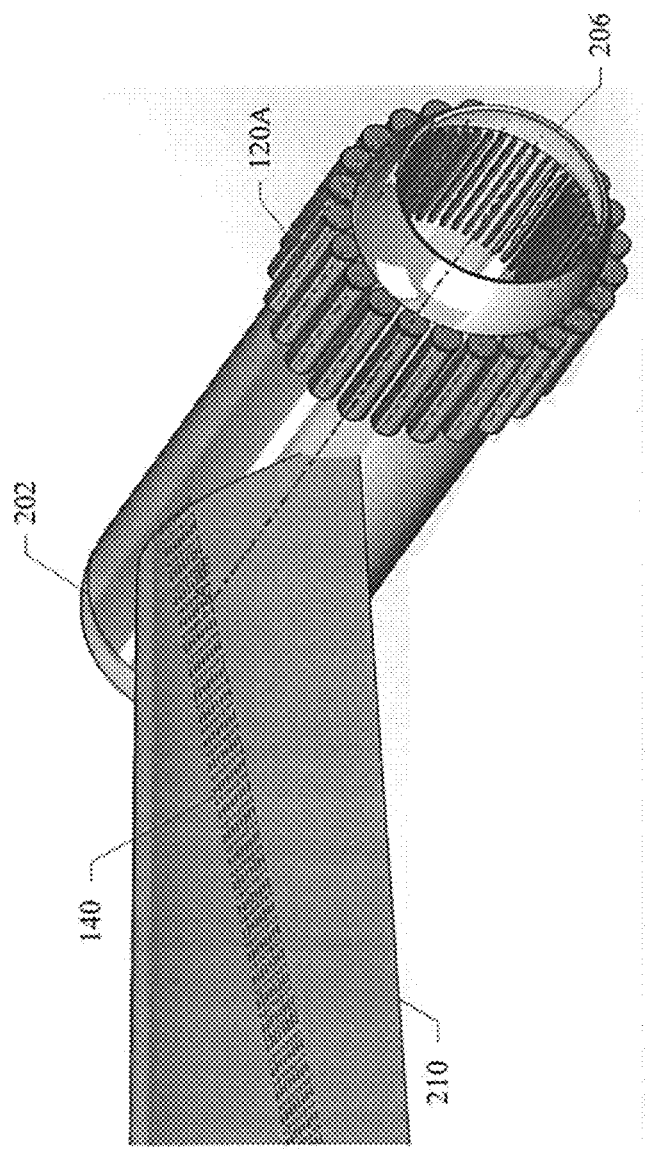
FIG. 4 is a close up view of a turbofan engine illustrating one example embodiment of a location of thermo-acoustic engines that utilize the waste heat exhaust in accordance with aspects of the innovation.
Figure 5:
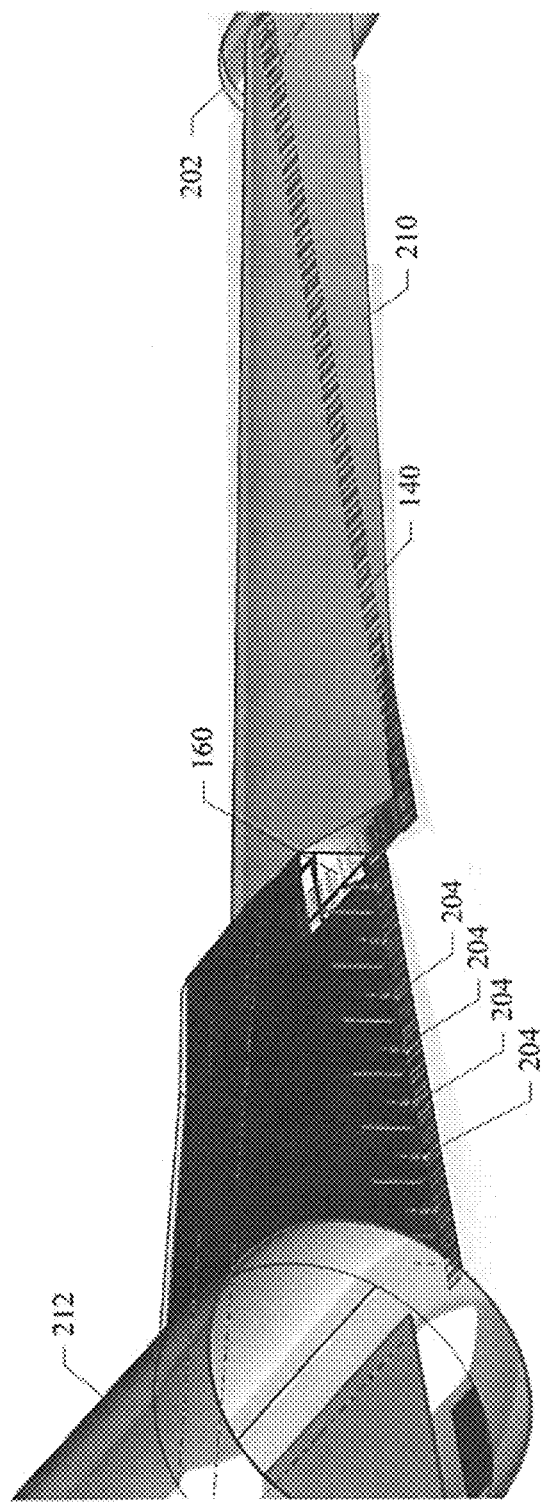
FIG. 5 is a close-up view of the wings section of the aircraft illustrating the location of the hollow acoustic wave tubes in accordance with aspects of the innovation.

Given that most of the thrust is generated via bypass section 725, minor disturbances in the airflow directly downstream of the turbine 720 (e.g., at an exhaust nozzle) have relatively little impact on the overall thrust produced via the engine 700. As such, an outlet of the core section 730 constitutes an environment with large amounts of unused waste heat in a position producing relatively small amounts of thrust. Such conditions render the exhaust outlet a good position for the heat engines 120A described herein. For example, in certain embodiments, the exhaust nozzle includes Nozzle guide vane (NGV) fins. In some embodiments, heat engines 120A may be disposed on the NGV fins, which beneficially transfer heat from the exhaust to the exterior of the nozzle. Such transferred heat may convectively heat the hot heat exchanger 122 to facilitate generation of an acoustic wave. It should be understood that various numbers of heat engines 120A may be disposed at the core outlet. For example, FIG. 4 depicts a plurality of evenly distributed heat engines 120A around the entirety of the circumference of the exhaust nozzle. It should be appreciated that any number of heat engines 120A may be deployed in various distributions consistent with the present disclosure.

Figure 8:
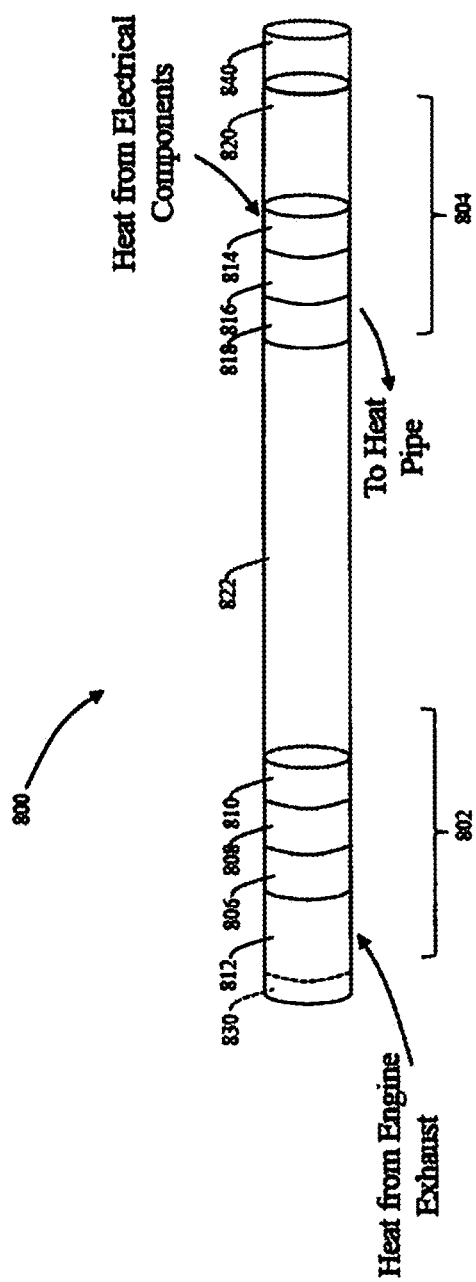
FIG. 8 is a schematic diagram of an acoustic thermal management tube in accordance with aspects of the innovation.

Referring now to FIG. 8, an acoustic thermal management tube 800 is shown according to an aspect of the present innovation. Acoustic thermal management tube 800 is shown to describe various operational aspects of the thermal management systems described herein. As shown, the thermal acoustic management tube 800 includes a thermo-acoustic engine 802 and a thermo-acoustic heat pump 804. The thermo-acoustic engine 802 and thermo-acoustic heat pump 804 are acoustically coupled to one another via an acoustic tube 822. In other words, the thermo-acoustic engine 802, thermo-acoustic heat pump 804, and the acoustic tube 822 constitute a continuous propagation path for an acoustic wave generated (or amplified) via the thermo-acoustic engine 802 to travel to and energize the thermo-acoustic heat pump 804. It should be understood that while the acoustic tube 822 is depicted as a straight, cylindrical tube; many other forms are envisioned. For example, in some embodiments, the acoustic tube 822 may fit the contours of an aircraft body to which the acoustic thermal management tube is attached. Moreover, the acoustic tube 822 may not be a single piece, but a plurality of parts attached to one another having various forms. Moreover, the acoustic tube 822 may be constructed from a compliant material. In some embodiments, the compliant material may be a polymer based material such as polyurethane) that may be manipulated to any desired form (e.g., coiled, shaped, etc.). In some embodiments, the compliant material may include flexible thin walled aluminum, titanium, stainless steel, or any combination thereof. In some embodiments, acoustic tube may be additively manufactured to form a custom shape to be positioned in a containing entity (e.g., an aircraft).

Figure 9:
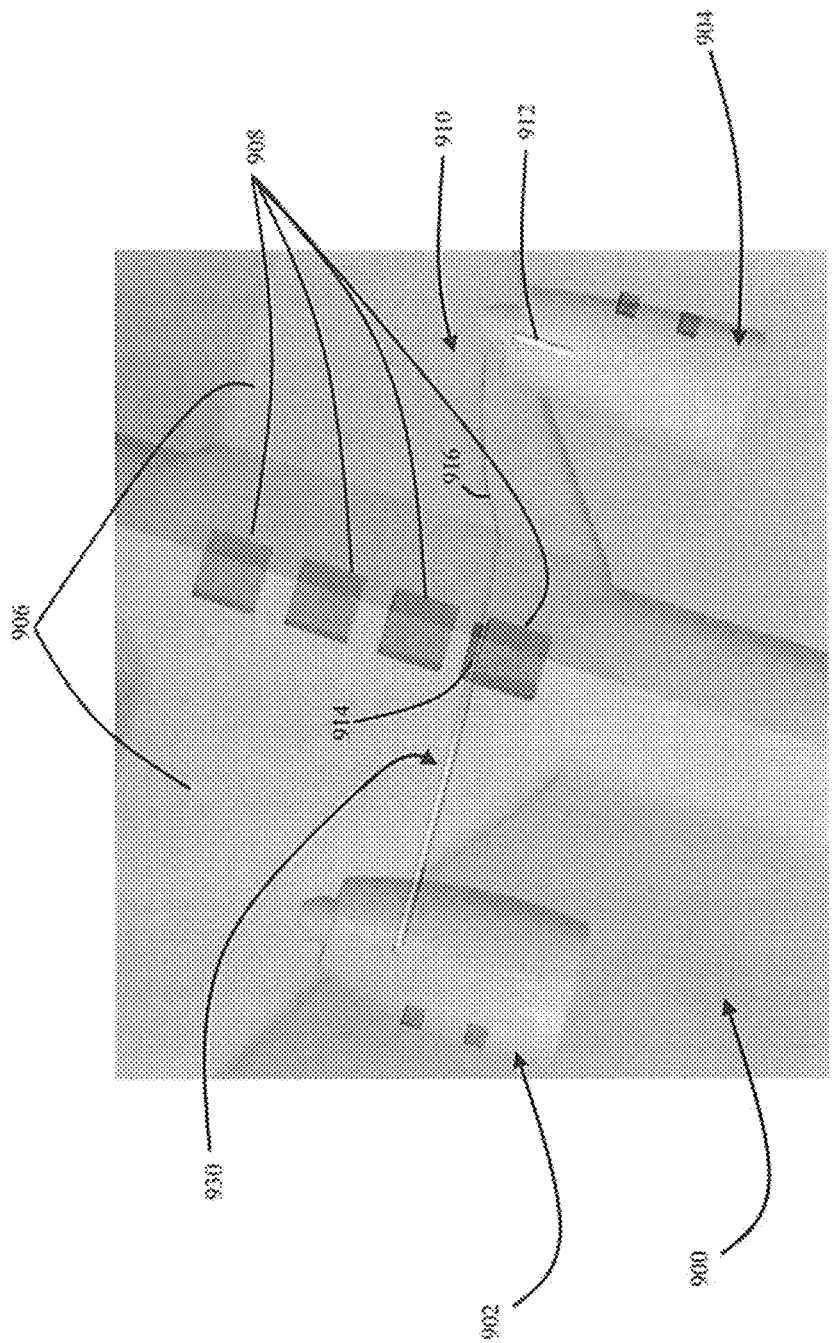
FIG. 9 is an underside view of an aircraft incorporating a thermo-acoustic thermal management system in accordance with aspects of the innovation.

Various portions of the acoustic thermal management tube 800 may be disposed at various different locations on an aircraft (as shown, for example, in FIG. 9). For example, thermo-acoustic engine 802 may be disposed proximate to an exhaust flow of a turbine engine of an aircraft. In one embodiment, thermo-acoustic engine 802 is disposed on an NGV fin at the exhaust nozzle of a core section duct, as discussed above with respect to FIG. 7. Thermo-acoustic heat pump 804 may be disposed proximate to an electrical component (e.g., a motor, generator, etc.) located in a central region of the aircraft (e.g., within or attached to a fuselage). Acoustic tube 822 may extend the entirety of the distance between thermo-acoustic heat engine 802 and thermo-acoustic heat pump 804 (e.g., through a wing of the aircraft and through/on the fuselage) such that they are acoustically coupled to one another.

As shown, thermo-acoustic engine 802 includes a cold heat exchanger 806, a regenerator 808, a hot heat exchanger 810. The cold heat exchanger 806, regenerator 808, and hot heat exchanger 810 are disposed inside of a container 812 (or pulse tube). Container 812 may have various forms depending on the implementation. For example, in some embodiments, container 812 may comprise a tube; and the cold heat exchanger 806, regenerator 808, and hot heat exchanger 810 may be disposed therein to generate a standing acoustic wave. This is beneficial in that no moving parts are required to generate the acoustic wave.

In various embodiments, cold heat exchanger 806, regenerator 808, hot heat exchanger 810, and container 812 may be pressurized with a gas such as helium. Hot heat exchanger 810 is exposed to a heat source (e.g., exhaust) and heated, while cold heat exchanger 806 is cooled (e.g., via air or a fuel) to establish a temperature gradient across the regenerator 808. This temperature gradient causes a localized pressure variation within the pressurized gas that propagates to form (or amplify) an acoustic wave. In other words, heat energy from the exhaust is converted to acoustic energy. The acoustic wave is then provided to the acoustic tube and then to acoustic heat pump 804.

As shown in FIG. 8, an acoustic wave source 830 is optionally coupled to the thermo-acoustic heat engine 802. For example, in some embodiments, the acoustic wave source 830 is a movable piston disposed at an end of the container 812. The movable piston may be coupled to an external actuator such that oscillations of the piston may be activated to generate an acoustic wave within the pressurized gas that is amplified via the thermo-acoustic engine 802. In other embodiments, acoustic wave source 830 may be a transducer (e.g., a magnetostrictive speaker, a piezoelectric speaker) configured to generate an acoustic wave that is amplified. In another example embodiment, acoustic wave source 830 is a standing wave thermo-acoustic engine (e.g., structured similar to the engine discussed above with respect to FIG. 2) configured to generate an acoustic wave without any moving parts. In such embodiments, acoustic wave source 830 may include a hot heat exchanger, regenerator, and cold heat exchanger disposed inside of a pressurized tube. The hot heat exchanger of acoustic wave source 830 may be heated externally (e.g., by an electric coil heater), and the stack may be disposed in the resonator such that a pressure differential across the regenerator propagates to form an acoustic wave that propagates to the container 812 for amplification via the thermo-acoustic heat engine 802. It should be appreciated that, while acoustic wave source 830 is shown to be substantially integrated with thermo-acoustic heat engine 802 (e.g., disposed at an end of the container 812), the acoustic wave source 830 may be completely separate from the thermo-acoustic engine 802 in other embodiments. For example, in some embodiments, acoustic wave source 830 may be disposed some distance (e.g., 10 cm, 10 m, 20 m, etc.) from the thermo-acoustic heat engine 802. In such embodiments, acoustic source 830 is coupled to the thermo-acoustic heat engine 802 via an acoustic tube. In various implementations, the acoustic tube is shaped (e.g., has a continuously changing volume profile, a volumetric extension, etc.) such that the acoustic wave generated via acoustic wave source 830 possesses a desired phasing (e.g., pressure-velocity phase matching) upon reaching thermo-acoustic heat engine 802.

Acoustic heat pump includes a hot heat exchanger 818, a regenerator 816, a cold heat exchanger 814, and a pulse tube 820. In various embodiments, hot heat exchanger 818, regenerator 816, cold heat exchanger 814, and pulse 820 may be pressurized with a gas such as helium. Various characteristics of the pulse tube 820 may be configured such that the acoustic wave generated via thermo-acoustic heat engine 802 and traveling through acoustic tube 822 is optimized for heat pumping. As shown, cold heat exchanger 814 is exposed to heat originating from an electrical component(s) of an aircraft (e.g., an electric motor). The acoustic wave originating from thermo-acoustic engine 802 is then provided to the thermo-acoustic heat pump 804, which is configured such that the acoustic wave initially compresses gas inside of pulse tube 820, and then expands the gas as its heated via the heat supplied to cold heat exchanger 814, thereby supplying heat to the hot heat exchanger 818. Heat from the hot heat exchanger 818 may then be used to conductively heat a gas within a tube (such as the hollow tubes 160 described herein). Such heat may be transferred back to an aircraft engine and used to pre-heat fuel, thereby further enhancing engine efficiency.

As shown in FIG. 8, thermo-acoustic heat pump 804 is coupled to an impedance matching element 840. Generally, after the acoustic wave performs work to pump heat from the cold heat exchanger 814 to the hot heat exchanger 818, there is some remaining energy within pulse tube 820. Impedance matching element 840 serves to dissipate such energy to prevent a reflection from an end surface of the pulse tube 820. Impedance matching element 840 may take various different forms depending on the implementation. For example, in one embodiment, impedance matching element 840 may take the form of a transducer configured to convert any remaining acoustic energy to electrical energy to power any electrical components in the environment of the thermo-acoustic management tube 800 (e.g., electrical components of an incorporating aircraft). It should be appreciated that such transducers may be placed at various other positions (e.g., within the acoustic tube 822, just prior to the thermo-acoustic heat pump 804, within the thermo-acoustic heat pump 804, etc.) to convert a portion of the generated acoustic energy to electricity in various embodiments.

In other embodiments, impedance matching element 840 may take the form of a standing wave thermo-acoustic engine (e.g., having a structure similar to that described herein with respect to FIG. 2). In another embodiment, the impedance matching element 840 may take the form of an extension (e.g., strut) extending from the pulse tube 820 configured to generate destructive interference therein to cancel out any remaining acoustic energy. In another embodiment, impedance matching element 840 may take the form of a layer of material (e.g., an aerogel) configured to dampen the acoustic wave at the end of the pulse tube 820.

It should be appreciated that, while various components of the acoustic thermal management tube 800 are shown to possess the same diameter, the sizing of various components therein may vary in size depending on the implementation. For example, in some embodiments, the diameter (or cross-sectional area) of the acoustic tube 822 may not match those of the thermo-acoustic heat engine 802 and/or thermo-acoustic heat pump 804. In one example embodiment, thermo-acoustic heat engine 804 is approximately 6-8 inches in length and approximately 1 inch in diameter, while the thermo-acoustic heat pump may be smaller, such as approximately 2 inches in length and ¾ inches in diameter). The acoustic tube 822 may be yet still smaller in diameter.

Generally, the cross-sectional area of the acoustic tube 822 may vary between the thermo-acoustic heat engine 802 and thermo-acoustic heat pump 804. For example, in one embodiment, the cross-sectional area of the acoustic tube 822 may continuously shrink between the thermo-acoustic heat engine 802 and thermo-acoustic heat pump 804 (i.e., shrink in cross-sectional area with distance from the thermo-acoustic heat engine 802) to compensate for a pressure-velocity phase mismatch in the acoustic wave once its amplified by the thermo-acoustic heat engine 802. For example, in some embodiments, the various components in the acoustic thermal management tube 800 may be sized such that pressure velocity phase matching occurs within the regenerator 818 of thermo-acoustic heat pump 804 to maximize heat pumping efficiency. Velocity pressure phase matching may occur at various locations within acoustic thermal management tube depending on the implementation. Various alternative design features may be used to achieve such phase matching. For example, acoustic tube 822 may include various extensions or struts extending therefrom in a direction perpendicular or substantially perpendicular to a central axis of the acoustic tube 822 to facilitate the phase matching. Such extensions may take various shapes. For example, in one embodiment, the extensions have a substantially tubular shaped and are sized to achieve the phase matching at the desired location.

Additionally, while the thermo-acoustic heat engine 802 and thermo-acoustic heat pump 804 are shown to possess single stages, it should be appreciated that either or both may contain multiple stages. For example, in one embodiment, thermo-acoustic heat engine 802 may include multiple combinations of heat exchangers and regenerators separated by a distance (e.g., a quarter or half the wavelength of the generated acoustic wave) to generate an amplified acoustic wave that traverses the acoustic tube 822. A multi-stage version of the thermo-acoustic heat pump 804 is also envisioned. Ultimately, any number of stages could be included depending on the implementation, as long as various other features (e.g., length of acoustic tube 822, placement of regenerators, size of impedance matching device 840) takes the incorporation of such stages into account.

Referring now to FIGS. 9-12, various perspective views of an aircraft 900 including a thermo-acoustic thermal management system in accordance with various aspects of the innovation are shown. Aircraft 900 is shown as an example of how various components (e.g., the acoustic thermal management tube 800) described herein may be used. It should be understood that this is only one example and various arrangements of the components described herein may be used depending on the context.

As shown in FIG. 9, aircraft 900 generally includes two wings 906. A first of the wings 906 has a first turbine engine 902 attached thereto, while a second of the wings 906 has a second turbine engine 904 attached thereto. Turbine engines 902 and 904 may generally operate as described herein with respect to FIG. 7, but the exact mode of operation may vary depending on the implementation. Body of aircraft 900 includes a plurality of electrical components 908. While four electrical components 908 are depicted, it should be understood that aircraft 900 may include any number of electrical components depending on the particular subsystems within aircraft 900. Exemplary electrical components 908 may include electrical generators, electrical motors (e.g., electric propulsion motors for a hybrid electric aircraft), control systems, thermal management systems, etc. Generally, operation of electrical components 908 generates waste heat that, if unmanaged, would be detrimental to continuous operation of electrical components 908.

Figure 10:
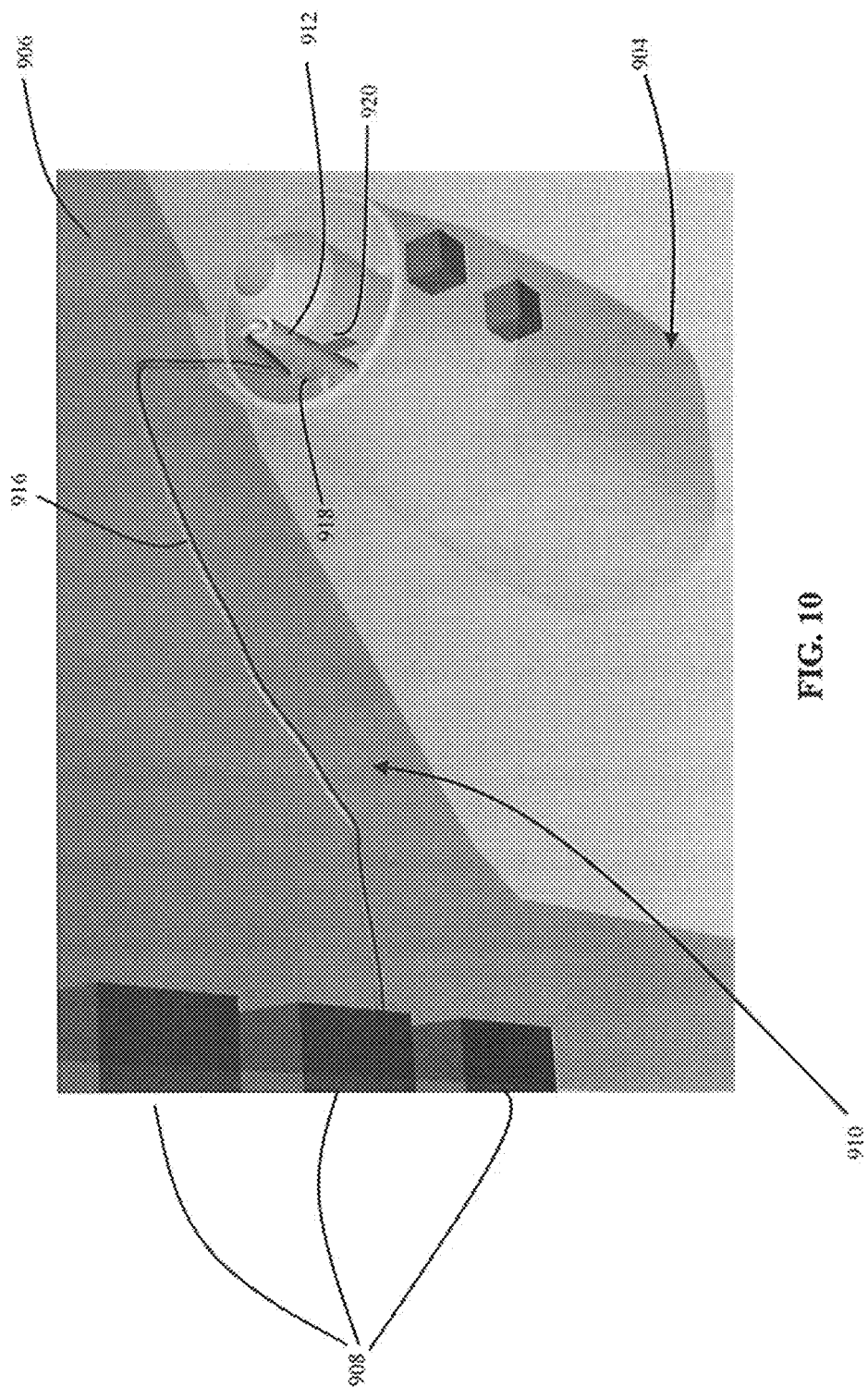
FIG. 10 is a perspective view of an acoustic thermal management tube on the aircraft shown in FIG. 9 in accordance with aspects of the innovation.
Figure 11:
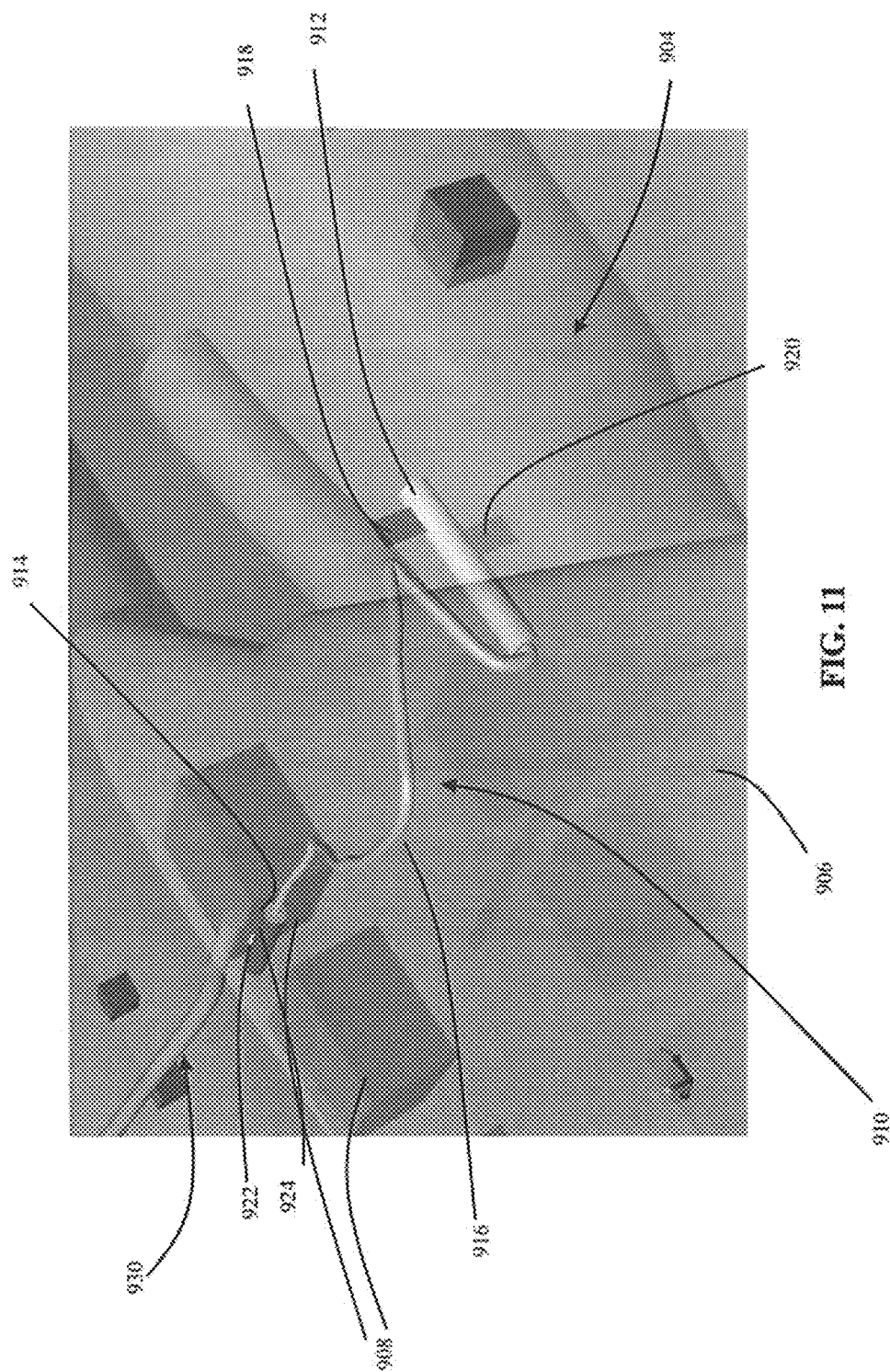
FIG. 11 is a perspective view of an acoustic thermal management tube on the aircraft shown in FIG. 9 in accordance with aspects of the innovation.

As shown in FIGS. 9, 10, and 11, aircraft 900 includes an acoustic thermal management system 910. Acoustic thermal management system 910 includes a thermo-acoustic engine 912, a thermo-acoustic heat pump 914, and an acoustic tube 916 that acoustically couples (e.g., provides a continuous propagation path for an acoustic wave) the thermo-acoustic engine 912 to the thermo-acoustic heat pump 914. Acoustic thermal management system 910 also includes a heat pipe 930 allowing heat to propagate from a hot region of thermo-acoustic heat pump 914 to the turbine engine 902. Acoustic thermal management system 910 generally operates as described above with respect to the thermal acoustic thermal management tube 800, except it is implemented on aircraft 900 for illustrative purposes.

As shown in FIGS. 10 and 11, thermo-acoustic engine 912 has thermally conductive elements 918 and 920 attached thereto. As used herein, the term "thermally conductive element" is used described any element used to provide a conductive heat connection. Examples of such thermally conductive elements include heat pipes and conductive metal elements. In the example shown, thermally conductive element 918 is conductively connected to a cold heat exchanger (not shown) of thermo-acoustic engine 912, while thermally conductive element 920 is conductively connected to a hot heat exchanger (not shown) of thermo-acoustic engine 912. As shown, thermally conductive element 920 extends towards the central flow of turbine engine 904. As such, thermally conductive element 920 is heated by the exhaust flow and conductively heats the hot heat exchanger. Thermally conductive element 918, in contrast, extends towards the bypass flow of the turbine engine 904, which is at or closer to ambient temperature. Due to this temperature difference, a temperature gradient is established across a regenerator (not shown) of thermo-acoustic heat engine 912. In various implementations, thermo-acoustic engine 912 includes an acoustic wave source (or has an acoustic wave source attached thereto) that generates an acoustic wave that is amplified via the thermal gradient. In other words, the normal operative state of the turbine engine 904 generates an amplified acoustic wave via the placement of the thermo-acoustic engine 912 shown.

As shown, the acoustic tube 916 extends from a downstream end of the thermo-acoustic engine 912 and is bent back in an upstream direction towards an attachment joint between turbine engine 904 and wing 906. Acoustic tube 916 extends through the attachment joint to an interior volume defined by the wing 906 and extends through the interior volume into the body of the aircraft housing the electrical components 908. As described herein, acoustic tube 916 may include various features (e.g., a continuously shrinking cross section, volumetric extensions branching out in the interior volume of the wing, etc.) to provide the requisite pressure-velocity phase matching for the amplified acoustic wave to reach the thermo-acoustic heat pump 914.

As shown in FIG. 11, the acoustic tube 916 attaches to an end of thermo-acoustic heat pump 914. Thermo-acoustic heat pump 914 has thermally conductive elements 922 and 924 attached thereto. As shown, thermally conductive element 922 is conductively connected to both the thermo-acoustic heat pump 914 and one of the electrical components 908 to receive waste heat therefrom. Thermally conductive element 922 generally provides the waste heat from the electrical component 908 to a cold heat exchanger (not shown) of the thermo-acoustic heat pump 914. The amplified acoustic wave from the thermo-acoustic engine 912 pumps the waste heat to a hot heat exchanger (not shown) that is conductively connected to the thermally conductive element (or radiator) 924. As shown, thermally conductive element 924 is also attached so as to transfer heat to the heat pipe 930. The work performed via the amplified acoustic wave raises a reject temperature of the waste heat of the electrical component 908 so as to render that waste heat usable in other processes occurring on aircraft 900.

Figure 12:
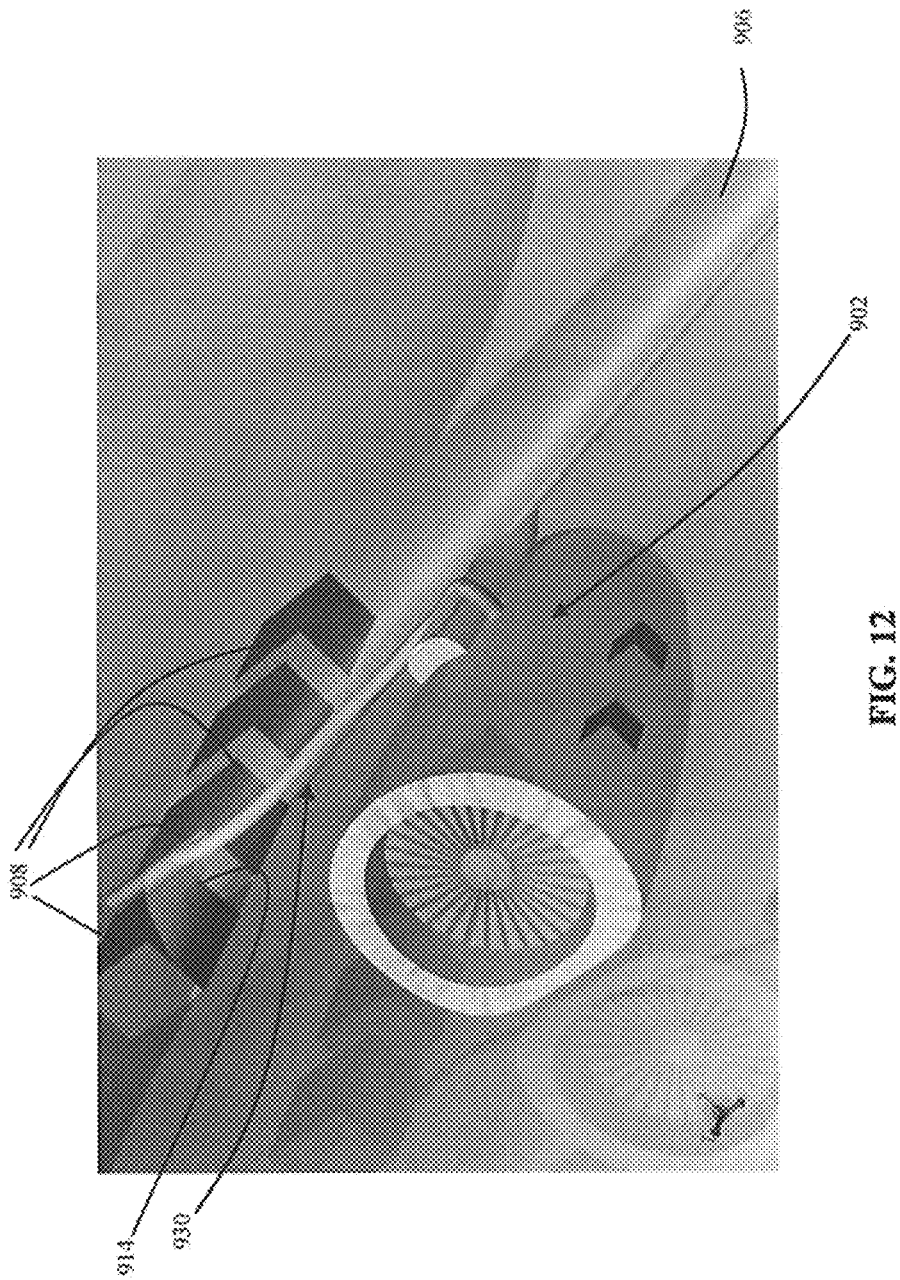
FIG. 12 is a perspective view of a heat pipe of the thermo-acoustic thermal management system shown in FIG. 9 in accordance with aspects of the innovation.

As shown in FIG. 12, heat pipe 930 extends through wing 906 of aircraft to turbine engine 902. Elevated temperature waste heat from electrical component 908 is provided back to, for example, the combustor of turbine engine 902 to pre-heat fuel thereof and increase efficiency, thereby productively using waste heat. It should be appreciated that the example depicted in FIGS. 9-12 is only one manner to utilize the various components and techniques described herein. Any number of thermo-acoustic engines, for example, may be attached to a particular turbine. Each thermo-acoustic engine used may include a separate acoustic tube coupling that thermo-acoustic engine to a separate heat pump. In some embodiments, multiple ones of such heat pumps are used to cool of single ones of the electrical components 908. In other circumstances, each electrical component 908 may have at least one heat pump attached thereto, and each heat pump may be coupled to a separate thermo-acoustic engine. Alternatively, a single thermo-acoustic engine may also be used to provide acoustic energy to multiple heat pumps (e.g., acoustic tube 916 may include branches connected to different heat pumps). Additionally, the aircraft 900 may include multiple heat pipes, and the heat pipes need not extend to different engines than those supplying the waste heat to generate the acoustic waves.

Figure 13:
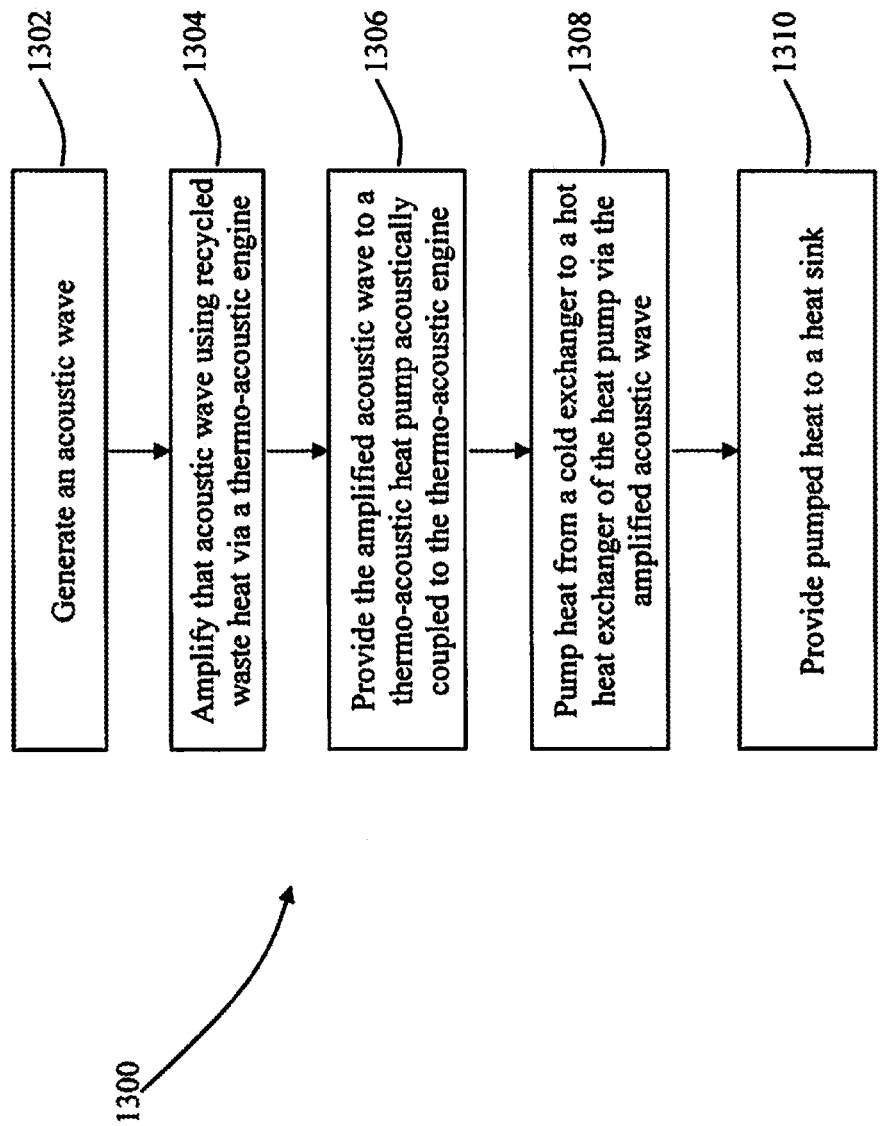
FIG. 13 is a flow diagram of a process of utilizing waste heat to provide thermal management in accordance with aspects of the innovation.

Referring now to FIG. 13, a flow diagram of a method 1300 of utilizing waste heat for thermal management is shown, according to an example embodiment. Method 1300 may be performed via the acoustic thermal management tube 800 or acoustic thermal management system 910 described herein. At 1302, an acoustic wave is generated via an acoustic wave source. In some embodiments, an acoustic wave is generated via a standing wave thermo-acoustic engine. In another embodiment, the acoustic wave is generated via a transducer. Such a transducer may either be incorporated into a thermo-acoustic engine (e.g., at an end of a pressure vessel containing a regenerator/heat exchanger combination) or generated externally to a thermo-acoustic engine (e.g., by a vibrating piston connected to a thermo-acoustic engine via an acoustic tube).

At 1304, the generated acoustic wave is amplified. In various embodiments, such amplification is achieved via a traveling wave thermo-acoustic engine including a hot heat exchanger heated via waste heat from an associated component (e.g., from exhaust of a turbine engine to which the thermo-acoustic engine is attached). At 1306, the amplified acoustic wave is provided to a thermo-acoustic heat pump that is acoustically coupled to the thermo-acoustic engine. For example, the amplified acoustic wave may propagate down an acoustic tube coupling pressure vessels of the thermo-acoustic engine and a heat pump.

At 1306, heat is pumped from a cold heat exchanger of a thermo-acoustic heat pump to a hot heat exchanger of the thermo-acoustic heat pump. As described herein, the cold heat exchanger may receive heat from an electrical component. At 1308, heat is pumped from the cold heat exchanger to a hot heat exchanger via the amplified acoustic wave to elevate a reject temperature of the waste heat of the electrical component. At 1310, the pumped heat is provided to a heat sink. The heat sink may take various forms depending on the implementation. For example, in one embodiment, the pumped heat is supplied to a duct of an HVAC system and the heat is used to heat the interior of a habitat. In another embodiment, a heat pipe is used to guide the pumped to heat to a particular component (e.g., a combustor of a turbine engine) to increase the efficiency thereof.

Figure 14:
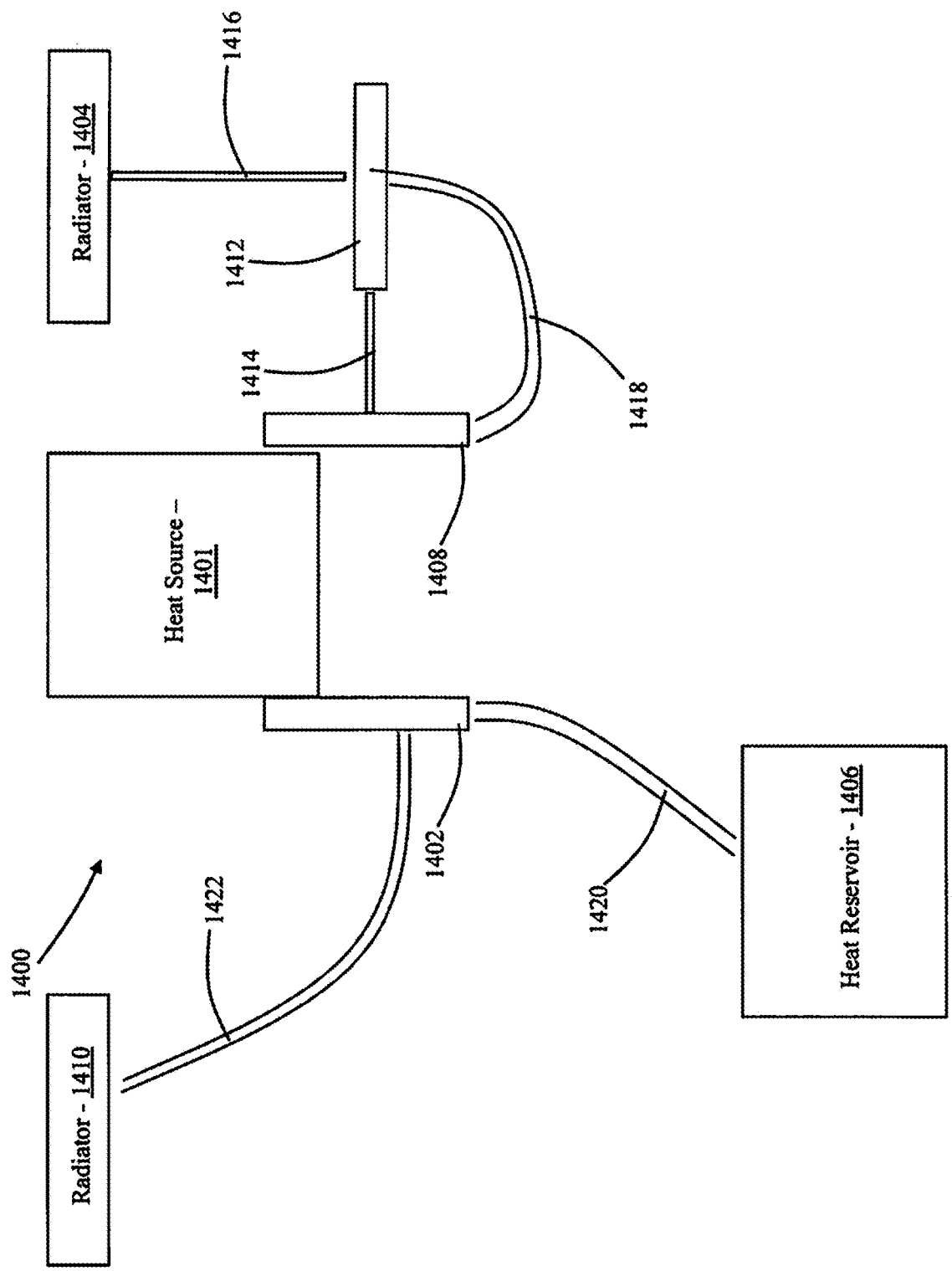
FIG. 14 is a block diagram of a thermal power management system in accordance with aspects of the innovation.

Referring now to FIG. 14, a block diagram of a thermal power management system 1400 is shown, according to an example embodiment. Thermal power management system 1400 may include various components described herein and is shown to exemplify an example of an alternative context (e.g., other than an aircraft) in which apparatuses such as the acoustic thermal management tube 800 described with respect to FIG. 8 may be used. Thermal power management system 1400 may be disposed in a plurality of different environments depending on the implementation. For example, in one implementation, thermal power management system 1400 may be disposed in the lunar environment and be configured to use waste heat from a lunar power source such as photovoltaic, fuel cell, or fission based to also provide heating and/or cooling for other processes (e.g., habitat heating/cooling, heat engine in-situ resource utilization, etc.) occurring thereon. Beneficially, the thermal acoustic power management systems described herein overcome many of the deficiencies (e.g., bulk, mass, mechanical issues, etc.) that render other power management technologies (e.g., electrical, fluid, phase change heat pipes, power beaming, mechanical, etc.) unsuitable for use in the lunar environment. Devices such as the acoustic thermal management tube 800 described herein generally have no moving parts, and thus require no lubrication, are naturally light weight, and mechanically compact.

As shown in FIG. 14, thermal power management system 1400 generally includes a waste heat source 1401, radiators 1404 and 1410, thermal to acoustic convertor 1402, heat engine 1412, heat pipe 1414, acoustic tube 1420, and a human habitat, equipment, or crater that requires heating and/or cooling referred to as a heat reservoir here 1406. Generally, radiators 1404 and 1410 serve to reject waste heat generated from heat source 1401 such that heat source 1401 maintains a sustainable operating temperature (e.g., avoids overheating). Heat source 1401 may be a power generator. For example, in one embodiment, heat source 1401 is a nuclear reactor generating significant quantities of waste heat. In other embodiments, power generators of other forms (e.g., chemical and solar) may also be used. Beneficially, thermal power management system 1400 incorporates thermo-acoustic heat engines and heat pumps configured as described herein to both effectively manage waste heat of the heat source and to reuse the waste heat for other beneficial purposes.

FIG. 14 depicts two thermo-acoustic engines 1402 and 1408 connected to heat source 1401. As will be appreciated, thermo-acoustic engines 1402 and 1408 possess structures similar to that discussed above with respect to the thermo-acoustic heat engine 802 of FIG. 8. Thermally conductive elements may couple heat exchangers of the thermo-acoustic engines 1402 and 1408 to relatively high and low temperature regions associated with the heat source 1401 such that a temperature gradient is established across a regenerator to amplify an acoustic wave generated by an acoustic wave source. While only two thermo-acoustic engines 1402 and 1408 are depicted, it should be appreciated that thermal power management system 1400 may include any number of thermo-acoustic engines, with any portion of these engines being arranged either as the thermo-acoustic engine 1402 or the thermo-acoustic engine 1408.

As shown, thermo-acoustic engine 1408 has an acoustic tube 1418 extending therefrom. Acoustic tube 1418 is attached to the cold rejector of a heat engine 1412 having a construction of a Brayton or Stirling engine. The heat pump end of acoustic tube 1418 actively lowers the reject temperature of the heat engine 1412, while increasing the reject temperature to the radiator 1404. This improves the efficiency of the heat engine while reducing the size of the radiator. Heat pipe 1414 provides heat emanating from thermo-acoustic heat engine 1408 to the heat engine 1412 (e.g., a cold heat exchanger thereof). The thermo-acoustic engine 1408 provides three functions, cools the heat source 1401, delivers its rejected heat to the heat engine 1412 via heat pipe 1414, and delivers acoustic energy via acoustic tube 1418 to a thermo-acoustic heat pump (not shown) that is connected to the cold end of heat engine 1412. The provided heat is pumped by the acoustic wave generated by thermo-acoustic engine 1408 to raise a reject temperature of the waste heat such that radiator 1404 (which is connected to thermo-acoustic heat pump at the end of acoustic tube 1418 via heat pipe 1416) may be smaller than if no thermo-acoustic heat pumping were used. The size of the radiator 1404 scales with temperature to the fourth power. The heat engine 1412 performs better with a lower reject temperature and the radiator 1404 performs better with a higher reject temperature. The acoustic energy in the acoustic tube 1418 drives a heat pump not shown to provide this separation of temperatures between the rejector of heat engine 1412 and the radiator 1404.

Thermo-acoustic engine 1402 generates an amplified acoustic wave in a manner similar to that described with respect to the thermo-acoustic engine 1408 described above. Remaining waste heat emanating from thermo-acoustic engine 1402 is provided via heat pipe 1422 to a radiator 1410. The amplified acoustic wave generated via thermo-acoustic engine 1402 is provided via an acoustic tube 1420 to heat reservoir 1406. It should be appreciated that, in this example, the acoustic tube 1420 is significantly longer (e.g., tens of meters vs meters) than the acoustic tube 1418. Amplified acoustic wave is thus transported a safe distance away from heat source 1402 such that the acoustic wave can be used to power other processes occurring in the environment of thermal power management system 1400.

Heat reservoir 1406 may take various forms depending on the implementation. For example, in one embodiment, heat reservoir 1406 may take the form of ambient air within a lunar habitat. A thermo-acoustic heat pump (not shown) disposed within the habitat may be used to extract heat from the heat reservoir such that the heat may be used to provide heating to the inhabitants therein. In another example, heat reservoir 1406 may take the form of lunar surface material, and a thermo-acoustic heat pump may be used to provide heat for various other processes (e.g., ice melting, hydrogen splitting, cryogenic fuel storage, etc.) occurring in the environment of thermal power management system 1400. Various combinations of thermo-acoustic engines and thermo-acoustic heat pumps using heat from heat source 1401 are envisioned.

Advantages to the innovative thermo-acoustic thermal management system disclosed herein is that thermo-acoustic technology is light-weight and efficient due to the creation of an acoustic wave to deliver cooling energy to distal locations through the aircraft. This eliminates the need to deliver energy with electrical, mechanical, or fluid flow, each of which adds mass and complexity. For example, electrical power distribution produces EMI, heating, and requires heavy cables. Mechanical distribution such as distributed torque shafts adds weight and requires lubrication. In addition, pumping a cryogenic fluid requires a large volume of fluid, pumping mechanisms, extensive insulation, and heavy heat exchangers to transfer heat energy.

Rather, once the acoustic wave is formed it is a simple matter to channel the wave in small tubes to anywhere in the aircraft. Since there are no moving parts in the cold region both the reliability and mass are suitable for aircraft. In addition, there are no hot moving parts since the thermos-acoustic engine is used to create the pressure wave, which eliminates the need for lubrication and maintenance.

Based on existing thermo-acoustic devices, a performance of the system is expected to be as follows: first, a jet engine is about 40% efficient. With the exhaust temperature at 850° C. the thermo-acoustic engine is approximately 25% efficient. At cryogenic temperatures of 50K, rejecting heat to 300K the cryogenic cooler requires 20 W of energy input for every 1 W of heat lifted. So to lift 500 kW of heat would require 10 MW of acoustic energy input from the pressure wave generator or about 40 MW of thermal heat or mechanical energy from the turbo-generator. Delivering this much heat energy is difficult to deliver into a single unit externally. Rather, the innovative thermal management system 100 utilizes multiple pipes to reduce the transfer required per pressure wave generator. This is economical since each generator is essentially a hollow tube. Further, if the hot air is directly inserted under turbine pressure into the pressure wave generator the hot heat exchanger is not required.

Mass and weight savings are realized due to that the thermal management system does not require liquid cryogenic fluid, does not require an alternator, does not require power wiring, does not require plumbing insulation, does not require EMI protection, does not require a large recuperator, the thermal management system simply and effectively conducts heat transfer to fins. Some energy savings are realized due to the utilization of the waste heat from the turbofan engines, no power is required for driving turbo-alternator or cryogen pumps, the thermal management system is a light-weight system that does not burden aircraft drag, there is no heating due to power wiring, no heat is lost through plumbing insulation, and EMI protection is not required. Finally, cost savings of the innovative thermal management system are realized due to that lubrication or maintenance is not required, power conversion equipment is not required for driving turbo-alternator or cryogen pump, there is minimal modification to existing aircraft, and no risk of spark ignition due to high voltages.

The innovative thermal management system is ideal for aircraft because it does not require extra fuel to operate it, it is light-weight, and it is essentially maintenance-free. It can be used to provide cabin cooling, ambient/cryogenic cooling of converter, cables, and motors. In addition it can be used to deliver power to remote locations on the aircraft without using wires. A non-cooling application would be to use the waste heat from a turbofan jet engine to generate a pressure pulse and deliver that pulse to small electric motors that do not provide propulsion, but instead eliminate the boundary layer induced wakes behind aircraft to reduce drag. This increases the fuel efficiency since the aircraft drag is reduced while using the otherwise wasted aircraft energy.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   a thermo-acoustic engine comprising a first heat exchanger, a regenerator, and a second heat exchanger disposed in a pulse tube, wherein the first heat exchanger is maintained at a higher temperature than the second heat exchanger by exposure to heat from a gas turbine engine of an aircraft, wherein the thermo-acoustic engine is configured to generate an acoustic wave within the pulse tube;
   an acoustic tube configured to receive the acoustic wave; and
   a thermo-acoustic heat pump configured to receive the acoustic wave via the acoustic tube, wherein the thermo-acoustic heat pump comprises a first heat exchanger, a regenerator, and a second heat exchanger disposed in a pulse tube, wherein the first heat exchanger is maintained at a higher temperature than the second heat exchanger due to the acoustic wave performing work to transfer heat from the second heat exchanger to the first heat exchanger, wherein the heat transferred via the acoustic wave is generated by a second heat source connected to the second heat exchanger.

2. The apparatus of claim 1, wherein the acoustic tube is directly connected to the pulse tubes of the thermo-acoustic heat pump and the thermo-acoustic engine, respectively.

3. The apparatus of claim 1, wherein the thermo-acoustic engine is disposed proximate to an exhaust stream of the gas turbine engine, wherein the first heat exchanger of the thermo-acoustic engine is disposed more proximate to the exhaust stream than the second heat exchanger of the thermo-acoustic engine.

4. The apparatus of claim 1 further comprising a plurality of thermo-acoustic engines configured to generate acoustic waves via the gas turbine engine of an aircraft and a plurality of additional acoustic tubes coupled to the plurality of thermo-acoustic engines, wherein the plurality of additional acoustic tubes are configured to guide the acoustic waves to additional heat sources of the apparatus.

5. The apparatus of claim 4, further comprising a plurality of additional thermo-acoustic heat pumps coupled to the plurality of additional acoustic tubes, wherein the plurality of additional thermo-acoustic heat pumps are configured to raise waste heat temperatures of the additional heat sources using acoustic energy from the acoustic waves generated via the plurality of thermo-acoustic engines.

6. The apparatus of claim 5, wherein the heat from a gas turbine engine of an aircraft is an exhaust flow from the gas turbine engine of an aircraft, wherein the plurality of thermo-acoustic engines are disposed around an exhaust nozzle of the gas turbine engine.

7. The apparatus of claim 1, wherein the acoustic tube extends through a wing of the aircraft.

8. The apparatus of claim 7, wherein the second heat source is an electrical component of the aircraft.

9. The apparatus of claim 8, wherein the electrical component is an electric motor.

10. The apparatus of claim 8, further comprising a hollow tube extending between the thermo-acoustic heat pump and the gas turbine engine, wherein heat is radiated from the second heat exchanger into the hollow tube such that the radiated heat is transferred to the turbine engine.

11. A method of utilizing waste heat from an aircraft engine comprising:
    generating an acoustic wave via a thermo-acoustic engine using exhaust of the aircraft engine to create a thermal gradient within the thermo-acoustic engine;
    providing, via an acoustic waveguide, the acoustic wave to a thermo-acoustic heat pump; and
    pumping, via the thermo-acoustic heat pump, heat from a heat source disposed proximate to the thermo-acoustic heat pump, wherein the thermo-acoustic heat pump comprises a first heat exchanger, a regenerator, and a second heat exchanger, wherein the first heat exchanger is heated via the heat source, wherein the second heat exchanger is maintained at a higher temperature than the first heat exchanger due to work performed via the acoustic wave.

12. The method of claim 11, wherein the thermo-acoustic engine includes a first heat exchanger, a second heat exchanger, and a regenerator disposed in a pulse tube, wherein the exhaust heats the first heat exchanger to maintain the first heat exchanger at a higher temperature than the second heat exchanger to generate the acoustic wave.

13. The method of claim 12, wherein the regenerator is disposed directly between the first and second heat exchangers of the thermo-acoustic engine such that the heat exchangers establish a temperature gradient across the regenerator.

14. The method of claim 11, wherein the heat source is waste heat from an electrical component of an aircraft.

15. The method of claim 14, wherein the electrical component comprises one of an electrical motor or an electrical generator.

16. The method of claim 14, wherein the work performed via the acoustic wave increases a range of temperatures of the waste heat.

17. The method of claim 16, further comprising providing, via a heat tube, the increased range of temperatures waste heat back to the aircraft engine to pre-heat fuel.

* * * * *